May 3, 1932. E. E. HILLS 1,856,132
FRAME FOR HEATED DOUBLE GLASS WINDSHIELDS
Filed May 18, 1928
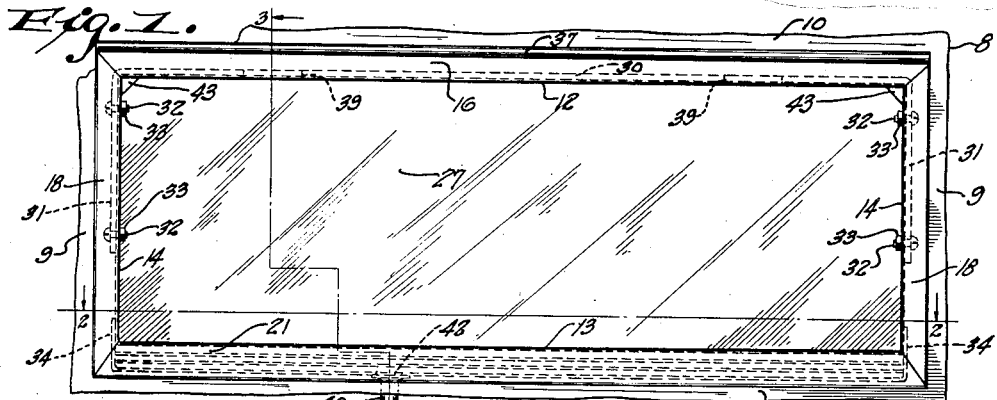
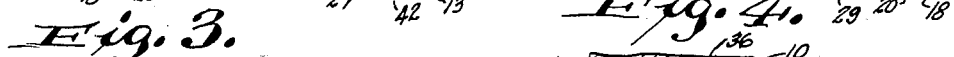
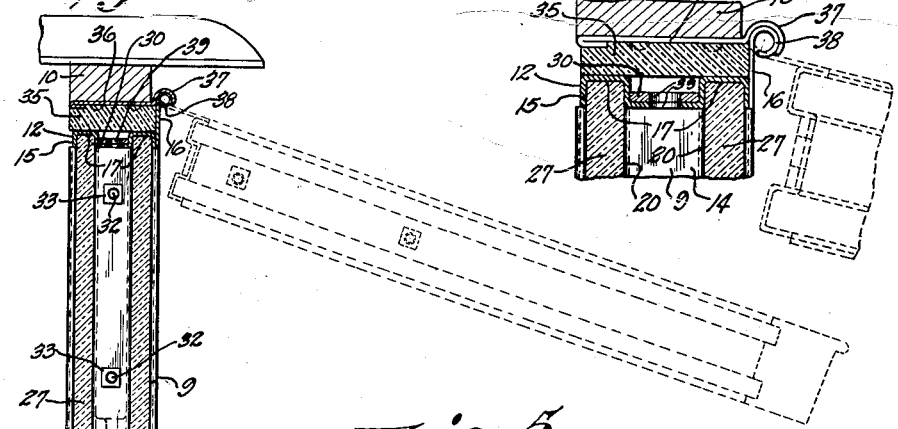
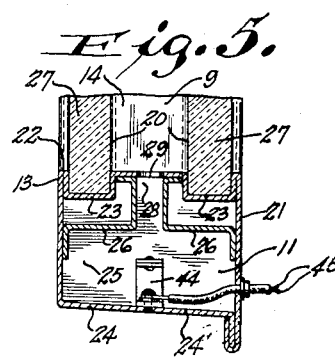
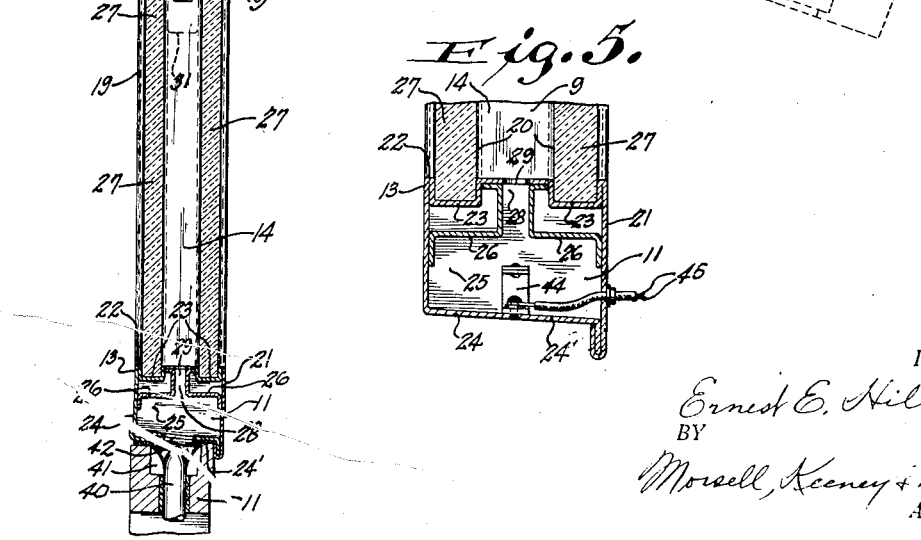
INVENTOR.
Ernest E. Hills.
BY
Morsell, Keeney & Morsell,
ATTORNEYS.

Patented May 3, 1932

1,856,132

UNITED STATES PATENT OFFICE

ERNEST E. HILLS, OF OSHKOSH, WISCONSIN

FRAME FOR HEATED DOUBLE GLASS WINDSHIELDS

Application filed May 13, 1928. Serial No. 278,809.

This invention relates to improvements in frames for heated double glass windshields, particularly adapted for vehicle.

Double glass windshields, arranged so that heat may be introduced into the compartment formed between the panes of glass, will prevent the collection of frost, snow, vapor or other matter which is a hindrance to the vision of the vehicle driver.

It is the primary object of the present invention to provide a windshield frame adapted to hold two panes of glass in spaced relation, and especially adapted for motor vehicles.

A further object of the invention is to provide a double glass windshield frame for vehicles which may be swung outwardly to an open position, and which is also readily removable from the vehicle.

A further object of the invention is to provide a double glass windshield frame of the class described in which one of the panes of glass may be readily removed, as for summer use.

A further object of the invention is to provide a double glass windshield frame of the class described arranged so that both surfaces of both panes of glass may be readily cleaned when necessary.

A further object of the invention is to provide a double glass windshield frame of the class described which permits of ventilation of the heated compartment between the windshield glasses.

A further object of the invention is to provide a double glass windshield frame arranged so that heat will not be introduced directly against the lower edge portions of the glass held thereby.

A further object of the invention is to provide a double glass windshield frame of a sheet metal sectional construction permitting easy detachment of the component parts and being adapted for quick installation on any motor vehicle.

A further object of the invention is to provide a double glass windshield frame for vehicles which is of simple construction, is strong and durable, and is well adapted for the purposes described.

With the above and other objects in view, the invention consists of the improved double glass windshield frame, and its parts and combinations as set forth in the claim, and all equivalents thereof.

In the accompanying drawings in which the same reference characters indicate the same parts in all of the views:

Fig. 1 is a front view of the improved double glass windshield frame showing fragmentary portions of the vehicle in which it is mounted;

Fig. 2 is a horizontal sectional view taken on line 2—2 of Fig. 1;

Fig. 3 is a vertical sectional view taken on line 3—3 of Fig. 1 and on a larger scale, the dotted lines showing the frame when it is swung outwardly, as for removal;

Fig. 4 is an enlarged fragmentary detail sectional view of the upper portion of the frame; and Fig. 5 is an enlarged fragmentary detail sectional view of the lower portion of the frame showing the connections for an alternative form of heating means.

Referring now more particularly to the drawings, it will appear that the numeral 8 indicates the front portion of a motor vehicle body having vertical side posts 9, an upper rail 10, and a lower rail portion 11, the space enclosed between said portions being adapted to receive the improved double glass windshield frame.

The improved windshield frame is formed with a top member 12, a bottom member 13, and a pair of opposite side members 14. The top member 13 is formed of a strip of sheet metal bent to form a vertical rear flange 15, a vertical front flange 16, somewhat wider, and an intermediate portion provided with a pair of spaced glass channels 17. The side members 14 are also of bent sheet metal strips with flanged front and rear portions 18 and 19, respectively, and intermediate portions having pairs of spaced vertical glass channels 20. The bottom member 13 has a wide front flange 21, a narrower rear flange 22, and an intermediate portion with glass channels 23. As shown in Figs. 3 and 5, the bottom member is also provided with a depending enclosure 24 forming an elongated horizontally extending chamber 25 into which heat is introduced, as will later be explained.

Within the chamber 25 are secured a pair of opposed, horizontally extending angular walls 26. Said walls have horizontal portions spaced below the glass channels 23 to prevent heat from coming into direct contact with the lower edge portions of glass panes 27 mounted in said channels. Upper vertical portions of said inner walls form a neck portion 28 to direct heat through apertures 29 and into the space between said panes of glass 27.

Secured within the intermediate portion of the upper frame member 12, preferably soldered to the outer surface thereof is the horizontal intermediate portion 30 of a U-shaped securing strap. Said strap has depending side portions 31 which overlap the side frame members 14 and are secured thereto by screws or bolts 32 which are engaged at their inner end portions by nuts 33, said nuts being soldered to said frame members 14. In this manner, the top frame member is detachably connected to the side frame members. The lower frame member 13 is formed with angular extension portions 34 which are soldered to the lower end portions of the side frame members 14, whereby said members are connected to the lower frame member.

As shown clearly in Figs. 3 and 4, there is interposed between the upper rail 10 of the vehicle and the top member 12 of the windshield frame, a strip or rail 35, to the upper surface of which is connected an elongated hinge plate 36. Said hinge plate projects forwardly of the front of the rails 10 and 35 and is formed with a semi-circular rolled portion 37.

The front flange 16 of the frame top member 12 is provided with a rolled complementary hinge portion 38 which fits within the rolled portion 37 and is movable therein, permitting the windshield frame to be swung forwardly on the hinge, as shown in dotted lines in Figs. 3 and 4. Also the windshield frame may be entirely detached from its mounting by swinging it forwardly and then pulling it laterally to withdraw the frame hinge portion 38 from the hinge portion 37.

When the windshield frame is removed, as previously described, an elongated brush or cleaning device can be inserted through openings 39 in the top frame members 12 and 30 for the purpose of cleaning the inner surfaces of the glass panes 27. Also, when the frame is removed, the bolts 32 can be withdrawn to separate the connecting portions 31 from the side frame members 14, permitting a separation of the side frame members from the top frame member. This will allow the removal of one of the panes of glass, as for instance, for summer use, when a heated windshield is not required.

Normally, when mounted, the windshield frame is in a position with respect to the vehicle frame, as shown in Figs. 1 and 3. The flanged front portions 16, 18 and 21 of the frame members overlap the adjacent vehicle portions to insure tight joints. The rail 11 of the vehicle has its top surface slightly forwardly inclined and the bottom portion of the frame depending enclosure 24 is also forwardly inclined, as at 24'.

A tubular connection 40, adapted to be extended to the vehicle exhaust manifold (not shown) has an enlarged portion terminating in a recess 41 in the vehicle rail 11. Said end portion of the connection 40 registers, when the frame is in normal closed position, with an opening 42 in the bottom portion of the frame member 24. The heated air then rises through the neck 28 and passes through apertures 29 and into the space between the windshield panes. This will melt and cause the removal and prevent the collection of frost, snow, mist and the like on the windshield panes. The upper corners of the inner windshield pane are cut away, as at 43, for ventilating the compartment between the panes 27.

In Fig. 5 is illustrated a slightly modified form of construction in the lower portion of the windshield frame when an electrical heating element is used. The electrical heating element 44 is disposed within the depending enclosure 24 and the circuit wires 45 therefor extend outwardly through a side wall of the enclosure.

From the foregoing description it will be seen that the improved double glass windshield frame is of simple and novel construction and is well adapted for the purposes set forth.

What I claim as my invention is:

A metal, double glazed windshield frame, comprising a pair of side frame members, upper and lower frame members, each of said frame members having front, rear, and channeled intermediate portions, the lower frame member being secured to the side frame members and the latter being detachably secured to the upper frame member, and an elongated hollow enclosure depending from and underlying all of the lower frame member and integral therewith, said enclosure having a restricted outlet neck opening through said lower frame member between the channels thereof.

In testimony whereof, I affix my signature.

ERNEST E. HILLS.